(12) United States Patent
Youn et al.

(10) Patent No.: US 10,805,846 B2
(45) Date of Patent: Oct. 13, 2020

(54) METHOD AND TERMINAL FOR SUPPORTING SERVICE CONTINUITY AFTER PERFORMING HANDOVER

(71) Applicant: LG ELECTRONICS INC., Seoul (KR)

(72) Inventors: Myungjune Youn, Seoul (KR); Hyunsook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/088,549

(22) PCT Filed: Nov. 15, 2016

(86) PCT No.: PCT/KR2016/013137
§ 371 (c)(1),
(2) Date: Sep. 26, 2018

(87) PCT Pub. No.: WO2017/171189
PCT Pub. Date: Oct. 5, 2017

(65) Prior Publication Data
US 2019/0110231 A1 Apr. 11, 2019

Related U.S. Application Data

(60) Provisional application No. 62/314,417, filed on Mar. 29, 2016.

(51) Int. Cl.
*H04W 36/00* (2009.01)
*H04L 29/12* (2006.01)
(Continued)

(52) U.S. Cl.
CPC ..... *H04W 36/0055* (2013.01); *H04L 12/4633* (2013.01); *H04L 61/2007* (2013.01);
(Continued)

(58) Field of Classification Search
None
See application file for complete search history.

(56) References Cited

U.S. PATENT DOCUMENTS 8,644,245 B2 * 2/2014 Ahn ............... H04L 5/0007
370/330
2006/0104262 A1 * 5/2006 Kant ............... H04W 76/10
370/352

(Continued)

FOREIGN PATENT DOCUMENTS

CN 101686563 3/2010
KR 1020110124164 11/2011
(Continued)

OTHER PUBLICATIONS

PCT International Application No. PCT/KR2016/013137, International Search Report dated Feb. 1, 2017, 4 pages.

*Primary Examiner* — Bunjob Jaroenchonwanit
(74) *Attorney, Agent, or Firm* — Lee, Hong, Degerman, Kang & Waimey

(57) ABSTRACT

One disclosure of the present specification provides a method for supporting service continuity after a terminal performs a handover. The method may comprise: a step of transmitting, when re-assigned from a source user plane (UP) functional node to a target UP functional node in
(Continued)

accordance with performing a handover to a target base station, a PDU session creation request message to create a new PDU session with the target UP functional node; a step of receiving a PDU session creation response message including a newly allocated second IP address; a step of transmitting a tunneling request message including information on the newly allocated second IP address and information on a service flow requiring service continuity; and a step of encapsulating a packet, which has been generated with an existing first IP address by an upper layer of the terminal, with a new second IP address by a lower layer of the terminal and transmitting the encapsulated packet to the tunneling entity.

6 Claims, 21 Drawing Sheets

(51) Int. Cl.
*H04L 12/46* (2006.01)
*H04W 36/12* (2009.01)

(52) U.S. Cl.
CPC ...... *H04L 61/2076* (2013.01); *H04L 61/2521* (2013.01); *H04W 36/12* (2013.01)

(56) References Cited

U.S. PATENT DOCUMENTS

| | | | | |
|---|---|---|---|---|
| 2012/0144062 A1* | 6/2012 | Livet | ............ | H04L 45/24 709/239 |
| 2013/0064198 A1* | 3/2013 | Krishnaswamy | ....... | H04L 45/24 370/329 |
| 2014/0269289 A1* | 9/2014 | Effros | ............ | H04L 47/38 370/231 |
| 2014/0328246 A1* | 11/2014 | Xu | ............ | H04W 36/08 370/315 |
| 2015/0078173 A1* | 3/2015 | Javed | ............ | H04W 24/08 370/241 |
| 2015/0156660 A1* | 6/2015 | Luo | ............ | H04W 8/02 370/230 |
| 2016/0183156 A1* | 6/2016 | Chin | ............ | H04W 36/0022 370/331 |
| 2017/0041836 A1* | 2/2017 | Huang | ............ | H04L 29/06 |
| 2018/0139671 A1* | 5/2018 | Velev | ............ | H04W 4/70 |

FOREIGN PATENT DOCUMENTS

| | | |
|---|---|---|
| KR | 1020120027155 | 3/2012 |
| KR | 1020130117265 | 10/2013 |
| KR | 1020150096463 | 8/2015 |

* cited by examiner

METHOD AND TERMINAL FOR SUPPORTING SERVICE CONTINUITY AFTER PERFORMING HANDOVER

CROSS-REFERENCE TO RELATED APPLICATIONS

This application is the National Stage filing under 35 U.S.C. 371 of International Application No. PCT/KR2016/013137, filed on Nov. 15, 2016, which claims the benefit of U.S. Provisional Application No. 62/314,417, filed on Mar. 29, 2016, the contents of which are all hereby incorporated by reference herein in their entirety.

BACKGROUND OF THE INVENTION

Field of the Invention

The present invention relates to mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an untrusted network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an untrusted non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| Reference point | Description |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |

TABLE 1-continued

| Reference point | Description |
|---|---|
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ).

ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

In the 4th mobile communication system, an attempt to increase a cell capacity is continuously made in order to support a high-capacity service and a bidirectional service such as multimedia contents, streaming, and the like.

That is, as various large-capacity transmission technologies are required with development of communication and spread of multimedia technology, a method for increase a radio capacity includes a method of allocating more frequency resources, but there is a limit in allocating more frequency resources to a plurality of users with limited frequency resources.

An approach to use a high-frequency band and decrease a cell radius has been made in order to increase the cell capacity. When a cell having a small radius, such as a pico cell is adopted, a band higher than a frequency used in the existing cellular system may be used, and as a result, it is possible to transfer more information. However, since more base stations should be installed in the same area, higher cost is required.

In recent years, a Femto base station such as a Home (e)NodeB 30 has been proposed while making the approach to increase the cell capacity by using the small cell.

The Home (e)Node 30 has been researched based on a RAN WG3 of the 3GPP Home (e)NodeB and in recent years, the Home (e)NodeB 30 has been in earnest researched even in an SA WG.

FIG. 6 is a diagram illustrating the relationship between (e)NodeB and Home (e)NodeB.

The (e)NodeB 20 illustrated in FIG. 6 corresponds to a macro base station and the Home (e)NodeB 30 illustrated in FIG. 6 may correspond to the Femto base station. In the specification, (e)NodeB intends to be described based on terms of the 3GPP and (e)NodeB is used when NodeB and eNodeB are mentioned together. Further, Home (e)NodeB is used when Home NodeB and Home eNodeB are mentioned together.

Meanwhile, recently, with an explosive increase in data, there is a problem in that congestion occurs in a core network of a mobile communication operator, that is, the S-GW 52 and P-GW 53 in the EPC.

In order to solve this problem, the mobile communication operators have changed the S-GW 52 and the PDN-GW 53 to have a high capacity, or have added new equipment, which may lead to a disadvantage of requiring a significantly high cost. Further, an amount of data to be transmitted and received is exponentially increased day by day, which immediately leads to a disadvantage of overloading.

Meanwhile, various methods of optimizing the S-GW 52 and the PDN-GW 53 have been proposed without having to add the mobile communication network. For example, it has been proposed a technique (i.e., selected IP traffic offload (i.e., SIPTO)) for offloading a path via nodes of a public network, i.e., a wired network, without having to perform transmission/reception via the path through the mobile communication operator's network 60.

FIG. 7 shows the concept of a selected IP traffic offload (SIPTO).

As can be seen with reference to FIG. 7, an SIPTO technique offloads specific IP traffic (e.g., an Internet service) of a UE 10 to nodes of a wired network 700 without having to pass through nodes in an IP service network 600 of a mobile communication operator.

When SIPTO is applied along a path via a Home (e)NodeB, the function of a P-GW is additionally needed for a local network to which the Home (e)NodeB 30 is applied. The P-GW which is added to a local network as described above is called a local P-GW 53'.

In this way, when the SIPTO technique is used, it is needed that a P-GW for the UE is reselected or relocated as a local P-GW 53'.

In other words, the SIPTO technique may reduce overload on the EPC by routing traffic to a P-GW closest to the UE.

However, since the P-GW performs the role of allocating an IP address to the UE, if the P-GW is relocated, the IP address of the UE is changed accordingly. If the IP address of the UE is changed, the service may be discontinued, which causes a problem.

SUMMARY OF THE INVENTION

Accordingly, one disclosure of this specification is to propose a scheme capable of solving the aforementioned problems.

To achieve the object above, one disclosure of the present specification provides a method for supporting service continuity after a UE performs handover. The method may comprise transmitting, when a relocation from a source user plane (UP) functional node to a target UP functional node is performed according as handover is performed to a target eNB, a PDU session creation request message to create a new PDU session with the target UP functional node; receiving a PDU session creation response message including a newly allocated second IP address; transmitting a tunneling request message including information about the newly allocated second IP address and information about a service flow requiring service continuity; and encapsulating a packet, which has been generated with an existing first IP address by an upper layer of the UE, with the new second IP address by a lower layer of the UE and transmitting the encapsulated packet to the tunneling entity.

The PDU session creation request message may include an indication indicating a need for service continuity.

The method may further comprise receiving, from a Control Plane (CP) functional node, an instruction that the new PDU session has to be created before the PDU session creation request message is transmitted.

The method may further comprise receiving an IP packet by the lower layer from the eNB; performing decapsulation for removing a header with the second IP address from the received IP packet; and delivering a packet of which the header with the second IP address is removed and which retains only the first IP address to the upper layer of the UE.

To achieve the object above, one disclosure of the present specification also provides a method for supporting service continuity after a UE performs handover. The method may comprise receiving, when a relocation from a source user plane (UP) functional node to a target UP functional node is performed according as handover is performed to a target eNB, an indication message indicating that the target UP functional node and a new PDU session have been created. The indication message may include a newly allocated second IP address. The method may comprise transmitting a tunneling request message including information about the newly allocated second IP address and information about a service flow requiring service continuity; and encapsulating a packet, which has been generated with an existing first IP address by an upper layer of the UE, with the new second IP address by a lower layer of the UE and transmitting the encapsulated packet to the tunneling entity.

To achieve the object above, one disclosure of the present specification also provides a UE supporting service continuity after performing handover. The UE may comprise a transmission and reception unit; and a processor controlling the transmission and reception unit. The processor may be configured to perform a process for transmitting, when a relocation from a source user plane (UP) functional node to a target UP functional node is performed according as handover is performed to a target eNB, a PDU session creation request message to create a new PDU session with the target UP functional node; to perform a process for receiving a PDU session creation response message including a newly allocated second IP address; to perform a process for transmitting a tunneling request message including information about the newly allocated second IP address and information about a service flow requiring service continuity; and to perform a process for encapsulating a packet, which has been generated with an existing first IP address by an upper layer of the UE, with the new second IP address by a lower layer of the UE and transmitting the encapsulated packet to the tunneling entity.

According to a disclosure of the present specification, problems of the conventional technique can be solved.

DESCRIPTION OF EXEMPLARY EMBODIMENTS

Figure 1:
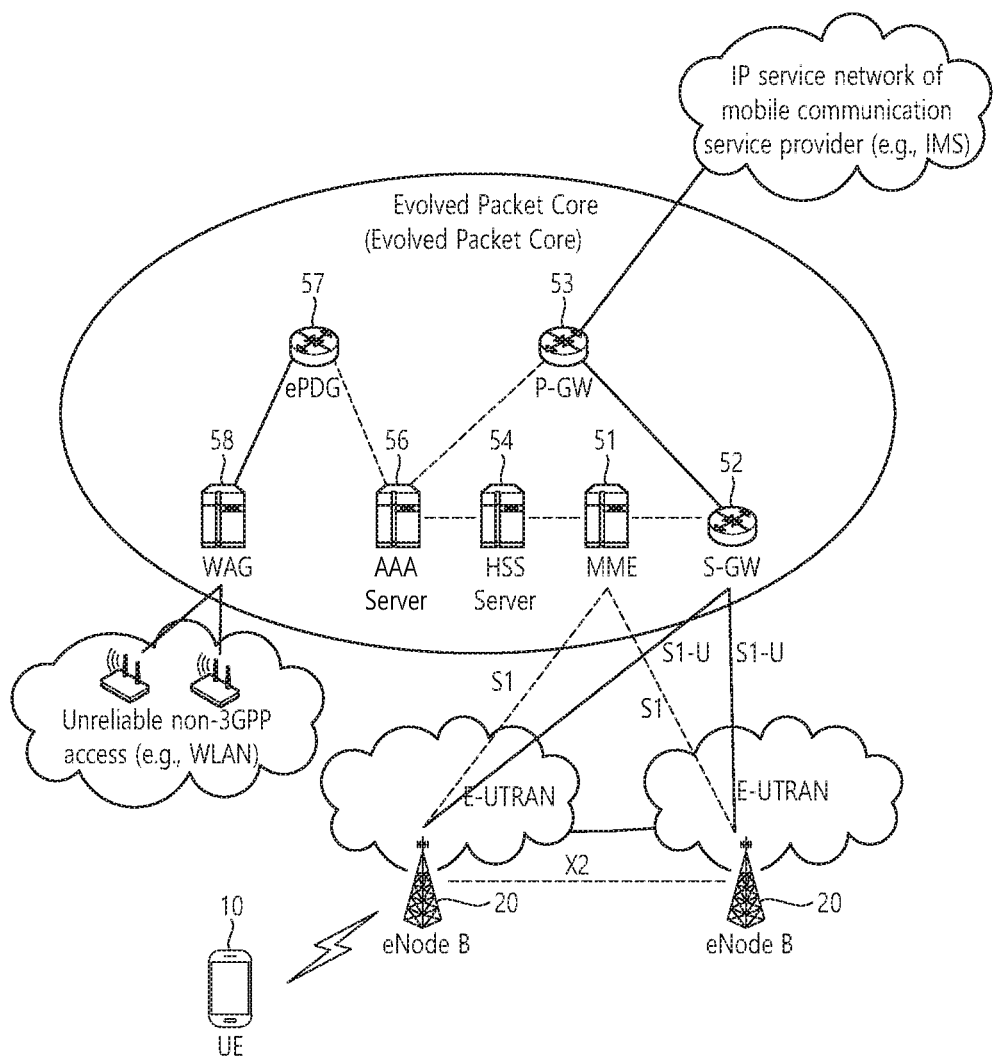
FIG. 1 is a structural diagram of an evolved mobile communication network.
Figure 2:
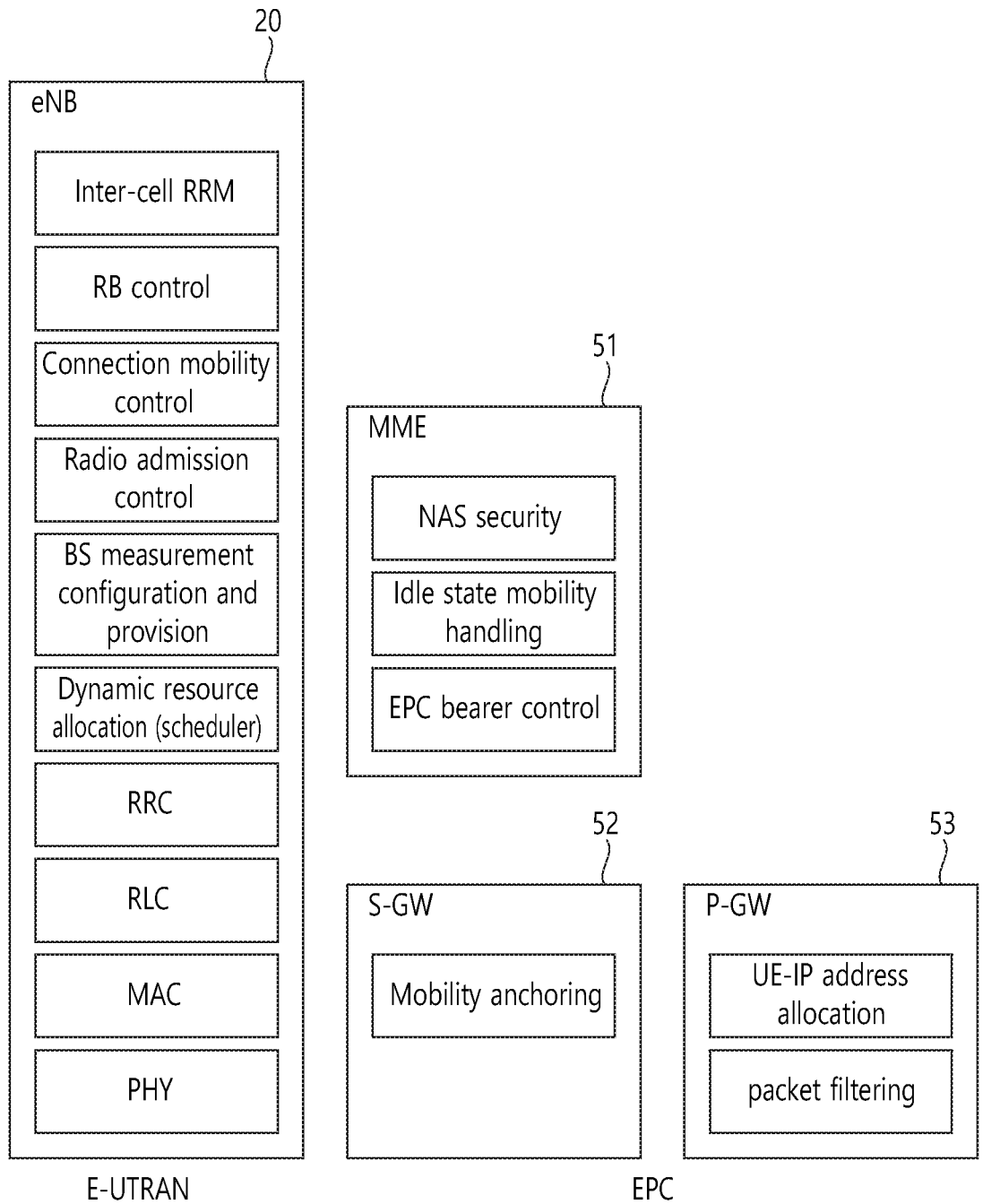
FIG. 2 is an exemplary diagram illustrating architectures of a general E-UTRAN and a general EPC.
Figure 3:
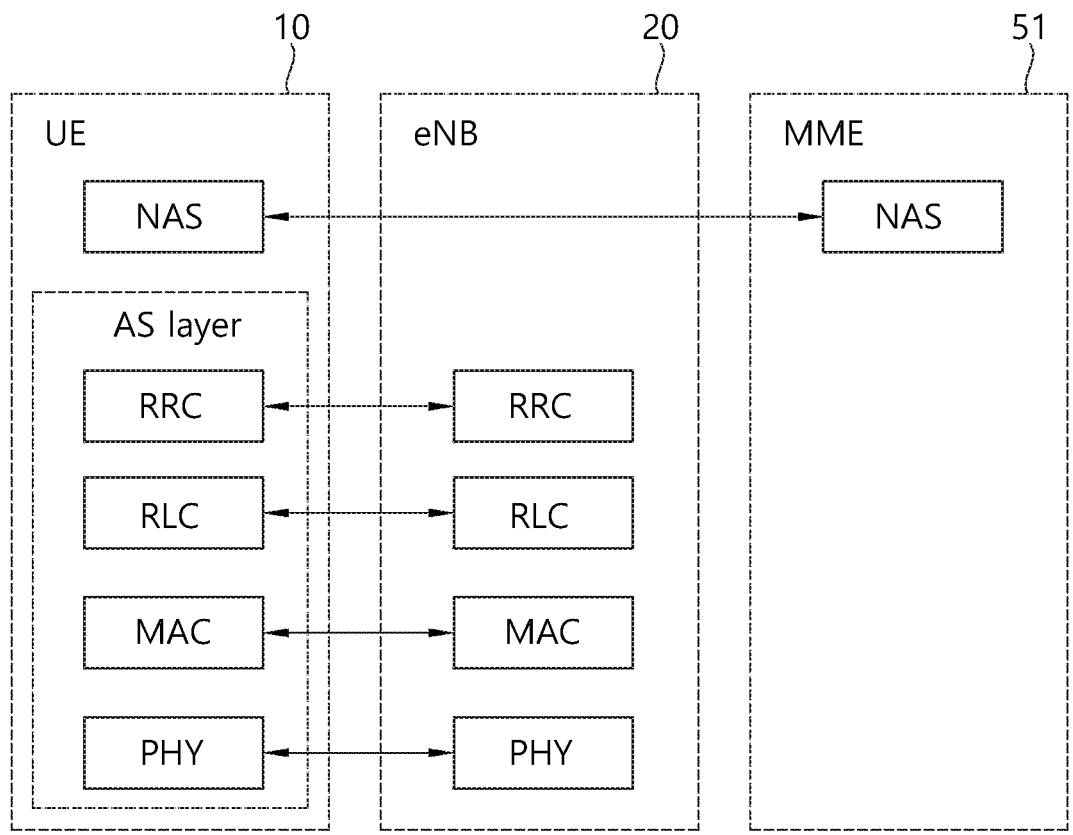
FIG. 3 is an exemplary diagram illustrating a structure of a radio interface protocol on a control plane between UE and eNodeB.
Figure 4:
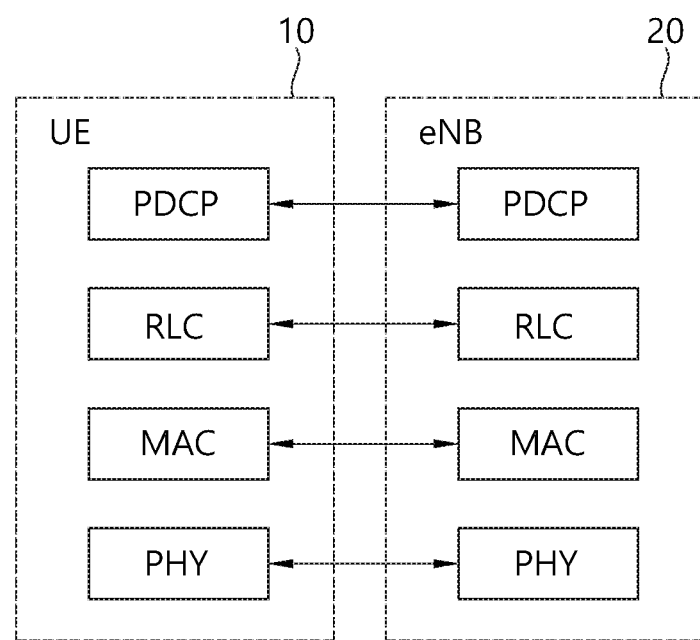
FIG. 4 is another exemplary diagram illustrating a structure of a radio interface protocol on a user plane between the UE and a base station.
Figure 5A:
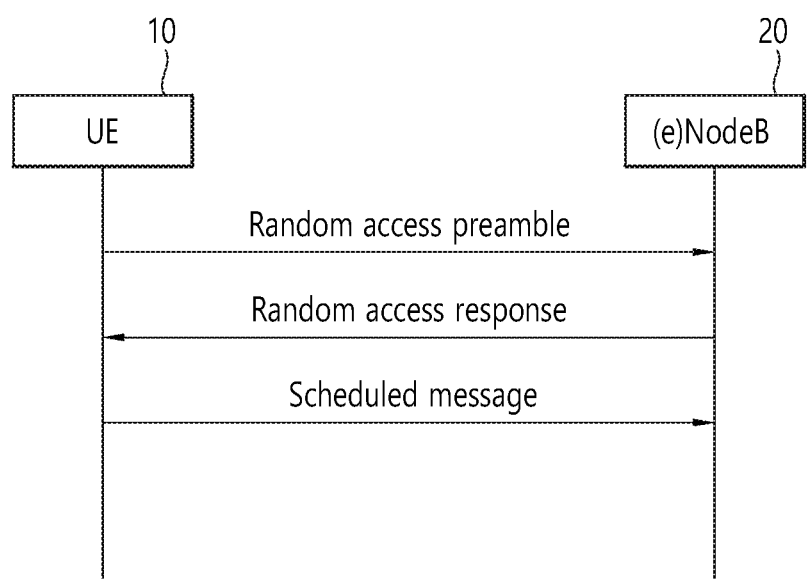
FIG. 5*a* is a flowchart illustrating a random access process in 3GPP LTE.
Figure 5B:
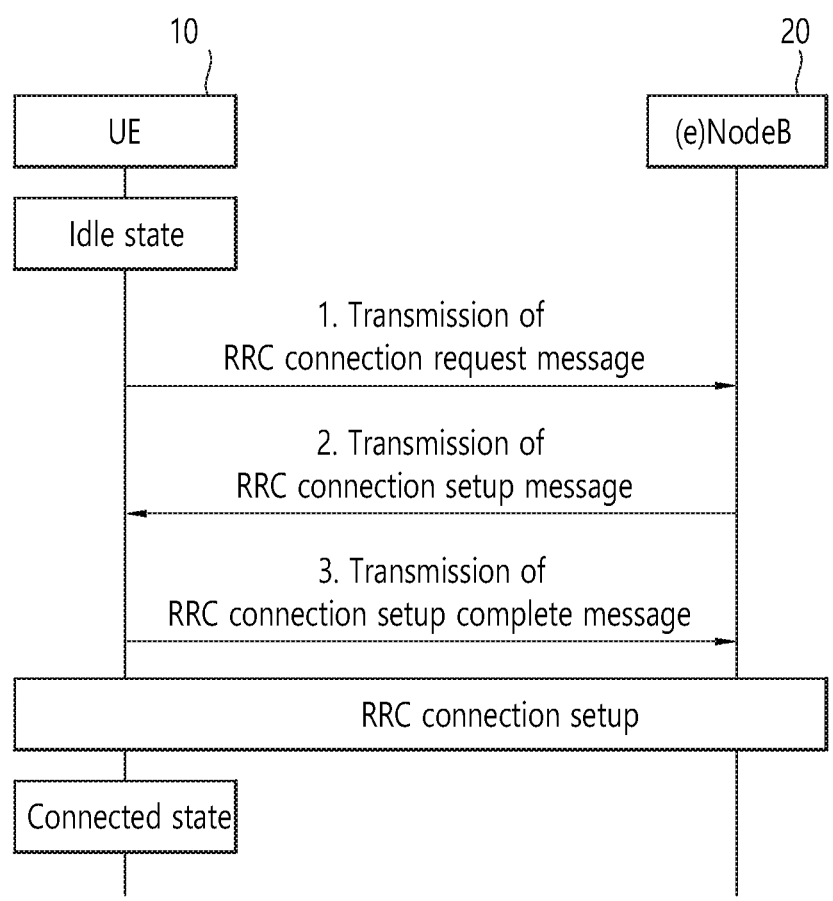
FIG. 5*b* illustrates a connection process in a radio resource control (RRC) layer.
Figure 6:
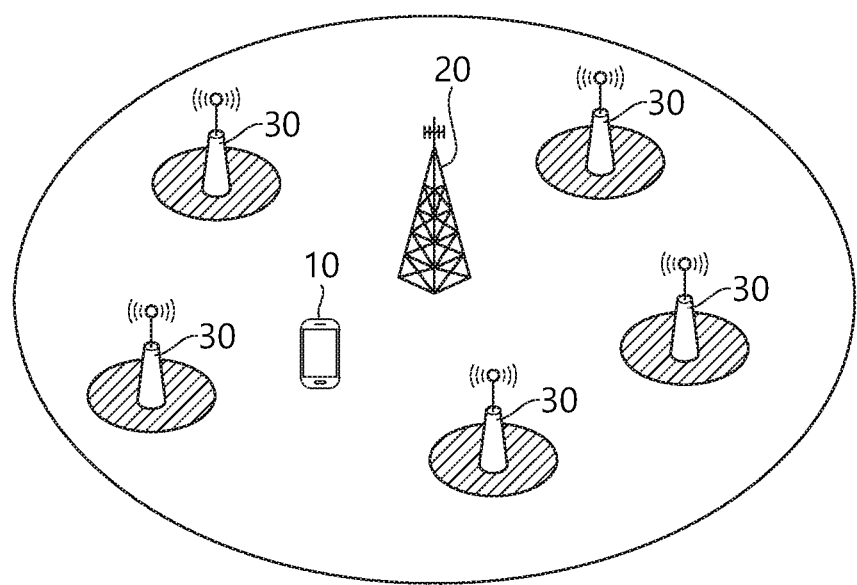
FIG. 6 is a diagram illustrating the relationship between (e)NodeB and Home (e)NodeB.
Figure 7:
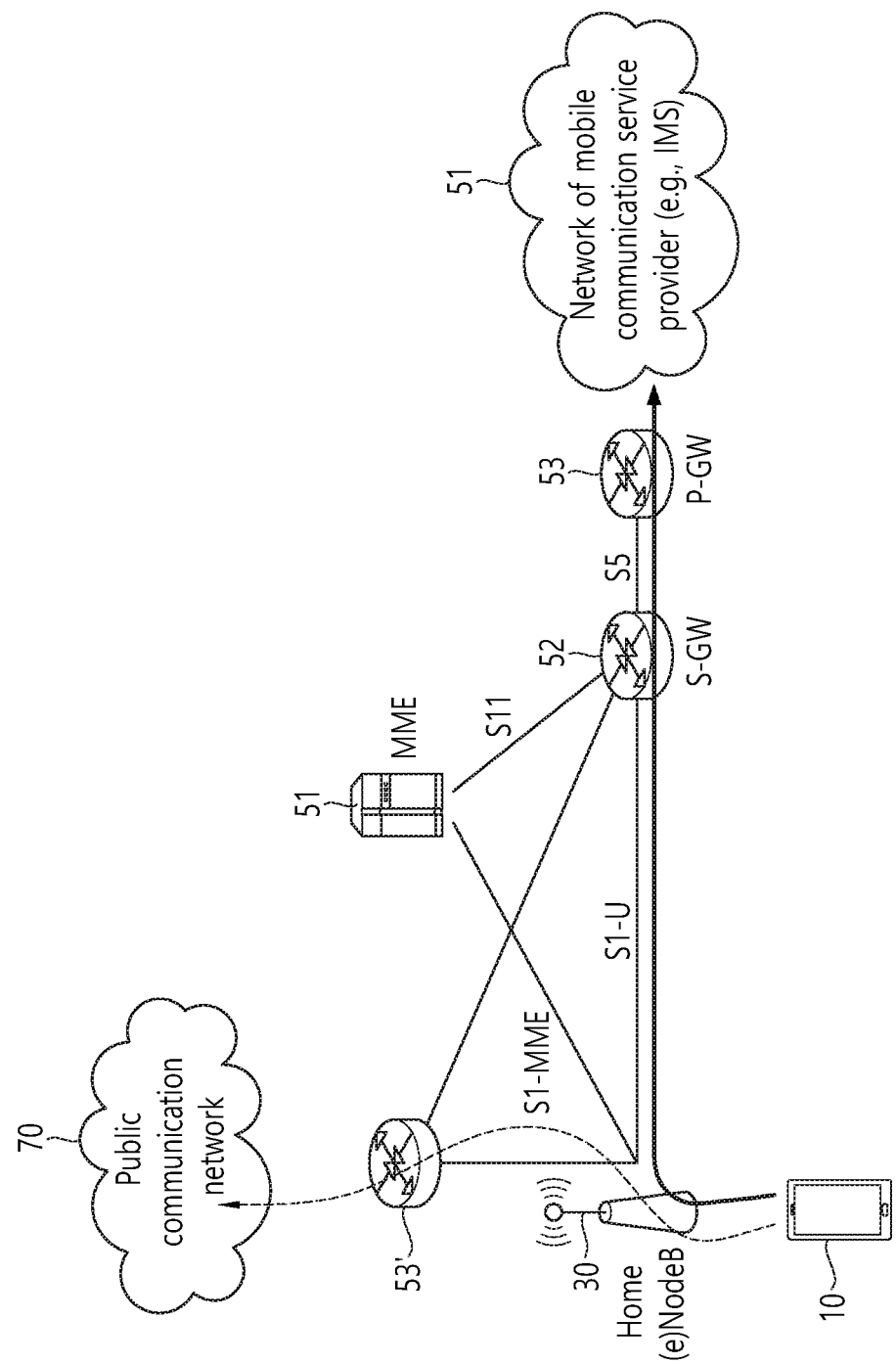
FIG. 7 shows the concept of a selected IP traffic offload (SIPTO).

The presented invention is described in light of UMTS (Universal Mobile Telecommunication System) and the EPC (Evolved Packet Core), but not limited to such communication systems, and may be rather applicable to all communication systems and methods to which the technical spirit of the presented invention may apply.

The technical terms used herein are used to merely describe specific embodiments and should not be construed as limiting the presented invention. Further, the technical terms used herein should be, unless defined otherwise, interpreted as having meanings generally understood by those skilled in the art but not too broadly or too narrowly. Further, the technical terms used herein, which are determined not to exactly represented the spirit of the invention, should be replaced by or understood by such technical terms as being able to be exactly understood by those skilled in the art. Further, the general terms used herein should be interpreted in the context as defined in the dictionary, but not in an excessively narrowed manner.

Furthermore, the expression of the singular number in the specification includes the meaning of the plural number unless the meaning of the singular number is definitely different from that of the plural number in the context. In the following description, the term 'include' or 'have' may represented the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the presented invention.

It will be understood that when an element or layer is referred to as being "connected to" or "coupled to" another element or layer, it can be directly connected or coupled to the other element or layer or intervening elements or layers may be presented. In contrast, when an element is referred to as being "directly connected to" or "directly coupled to" another element or layer, there are no intervening elements or layers presented.

Hereinafter, exemplary embodiments of the presented invention will be described in greater detail with reference to the accompanying drawings. In describing the presented invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smart phone, a multimedia device, or other portable device or may be a stationary device, such as a PC or a car-mounted device.

Definition of Terms

For better understanding, the terms used herein are briefly defined before going to the detailed description of the invention with reference to the accompanying drawings.

A GERAN: an abbreviation of a GSM EDGE Radio Access Network, and it refers to a radio access section that connects a core network and UE by GSM/EDGE.

A UTRAN: an abbreviation of a Universal Terrestrial Radio Access Network, and it refers to a radio access section that connects the core network of the 3rd generation mobile communication and UE.

An E-UTRAN: an abbreviation of an Evolved Universal Terrestrial Radio Access Network, and it refers to a radio access section that connects the core network of the 4th generation mobile communication, that is, LTE, and UE.

An UMTS is an abbreviation of a Universal Mobile Telecommunication System, and it refers to the core network of the 3rd generation mobile communication.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF): The node of an EPS network which performs a policy decision for dynamically applying QoS and a billing policy that are different for each service flow.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A Tunnel Endpoint Identifier (TEID): The end point ID of a tunnel set between nodes within a network, and it is set for each bearer unit of each UE.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

NAS (Non-Access-Stratum): A higher stratum of a control plane between a UE and an MME. The NAS supports mobility management, session management, IP address management, etc., between the UE and the network.

RAT: an abbreviation of Radio Access Technology. Means GERAN, UTRAN, E-UTRAN, etc.

MPTCP: It is an abbreviation of Multi-Path Traffic Control Protocol. A multipath TCP is a user interface such as TCP. Although a typical TCP interface is provided in this case, the existing TCP is improved so that data can be spread to several sub-flows.

Figure 8:
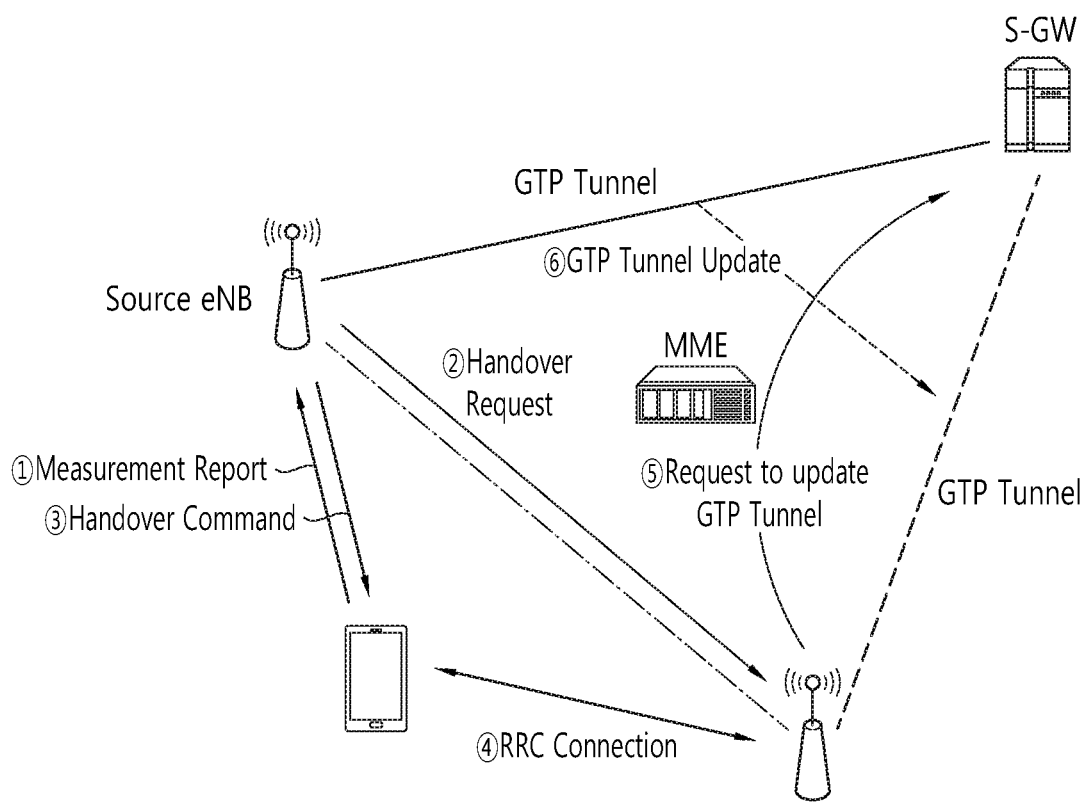
FIG. 8 illustrates a handover operation using GTP tunneling.

FIG. 8 Illustrates a Handover Operation Using GTP Tunneling.

As shown in the figure, a GPRS Tunneling Protocol (GTP)-based tunnel exists between an eNB and an S-GW, through which data of a UE are delivered to the S-GW via the eNB.

In the LTE network, after the UE is attached to the network, and a Packet Data Network (PDN) connection is established, an IP address is not changed and maintained at the initial address. Therefore, even if handover is performed, the IP address of the UE is not changed. Therefore, a session used by an application of the UE may be maintained. However, during handover, the UE's data held by a source eNB may be dropped; to prevent this, a forwarding tunnel is formed between the source eNB and the target eNB to deliver the data. In this way, while data are delivered from the source eNB to the target eNB, the target eNB informs the S-GW, through the MME, of the fact that the serving eNB of the UE has been changed, thereby changing the path through which data are actually delivered.

Figure 9:
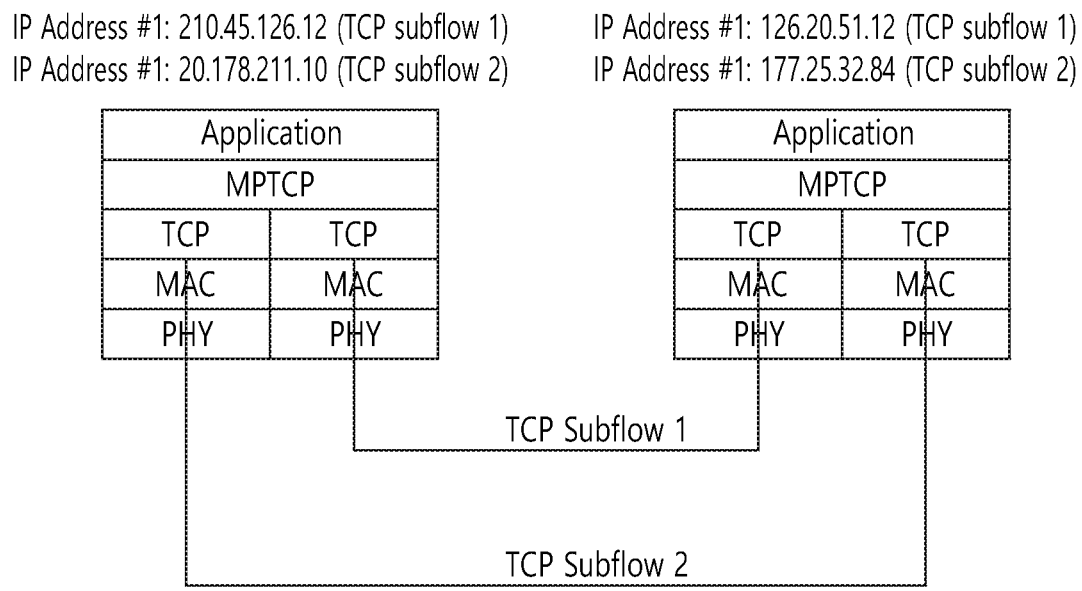
FIG. 9 illustrates a Multi-path TCP operation.

FIG. 9 Illustrates a Multi-Path TCP Operation.

Referring to FIG. 9, MPTCP is a protocol operating on top of the TCP layer. MPTCP connects multiple subflows by using TCP and thereby increases throughput by using multiple links simultaneously. For example, as shown in FIG. 9, TCP subflow 1 may be connected through a WLAN, and TCP subflow 2 may be connected through a cellular network (for example, LTE). In this case, the data sent by an application may be divided into the respective subflows according to the scheduling of the MPTCP and transmitted through both of the WLAN and the cellular network.

MPTCP may be used not only for simply improving throughput but also for providing session continuity when the UE performs handover. For example, when the UE leaves the coverage of the WLAN during communication through the WLAN, the UE generates a new subflow through the cellular network before the UE completely gets out of the coverage of the WLAN. In this way, even if the UE leaves the coverage of the WLAN, the subflow through the cellular network still remains, and thereby the session may be maintained even when the subflow of the WLAN is broken. However, in order to maintain the session continuity, the application has to support MPTCP, and both ends for communication (namely between UEs or between a UE and a server) have to support MPTCP.

<Improvement of SIPTO>

The SIPTO technique has been gradually improved along with the 3GPP releases.

First, the 3GPP release 10 has first specified the SIPTO; according to the specification, a seamless detour was not supported, and thus a user had to experience a temporary service disruption. This service disruption may be described as follows. First, if a UE moves to another eNB, a target MME may reselect or relocate a more appropriate P-GW (for example, a P-GW geographically closer to the location of the UE or a P-GW topologically closer to the UE) with respect to the current location of the UE by taking into account the movement, and determine to redirect the PDN connection of the UE to the reselected (or relocated) P-GW. In this way, if the MME determines reselection (or relocation) of the P-GW, the MME performs a PDN disconnection procedure which instructs "reactivation requested" to the UE with respect to the PDN connection to be redirected. If relocation of all of PDN connections has been determined with respect to the UE, the MME performs a detach procedure which instructs "explicit detach with reattach required" to the UE.

Meanwhile, if there is an application run by the UE while the reselection (or relocation) process of the P-GW is in progress (namely if there is traffic to be transmitted and received by the UE via an original P-GW), a service may be temporarily discontinued by the change of the IP address of the UE due to reselection (or relocation) of the P-GW.

To solve the problem of service disruption, the 3GPP release 11 allows the MME to release a PDN connection to perform P-GW reselection (or relocation) due to SIPTO only when i) the UE is in the idle mode or ii) the UE performs a Tracking Area Update (TAU) procedure which does not generate a bearer of the user plane. Accordingly, even if the UE moves in the connected mode, the MME is prevented from performing reselection (or relocation) to a different P-GW even though the different P-GW is more appropriate in view of the current location of the UE.

However, the 3GPP release 11 does not provide a method for providing reselection (or relocation) to a P-GW more appropriate in view of the current location of the UE while minimizing service disruption when the UE is in the connected mode.

Therefore, the 3GPP release 13 is studying a method for providing reselection (or relocation) to a P-GW more appropriate in view of the current location of the UE while minimizing service disruption even if the UE is in the connected mode.

In the 3GPP release 13, the aforementioned method is referred to as Coordinated Selected IP Traffic Offload (C-SIPTO). C-SIPTO means that the MME performs reselection (or relocation) of a P-GW through cooperation with a UE.

Figure 10A:
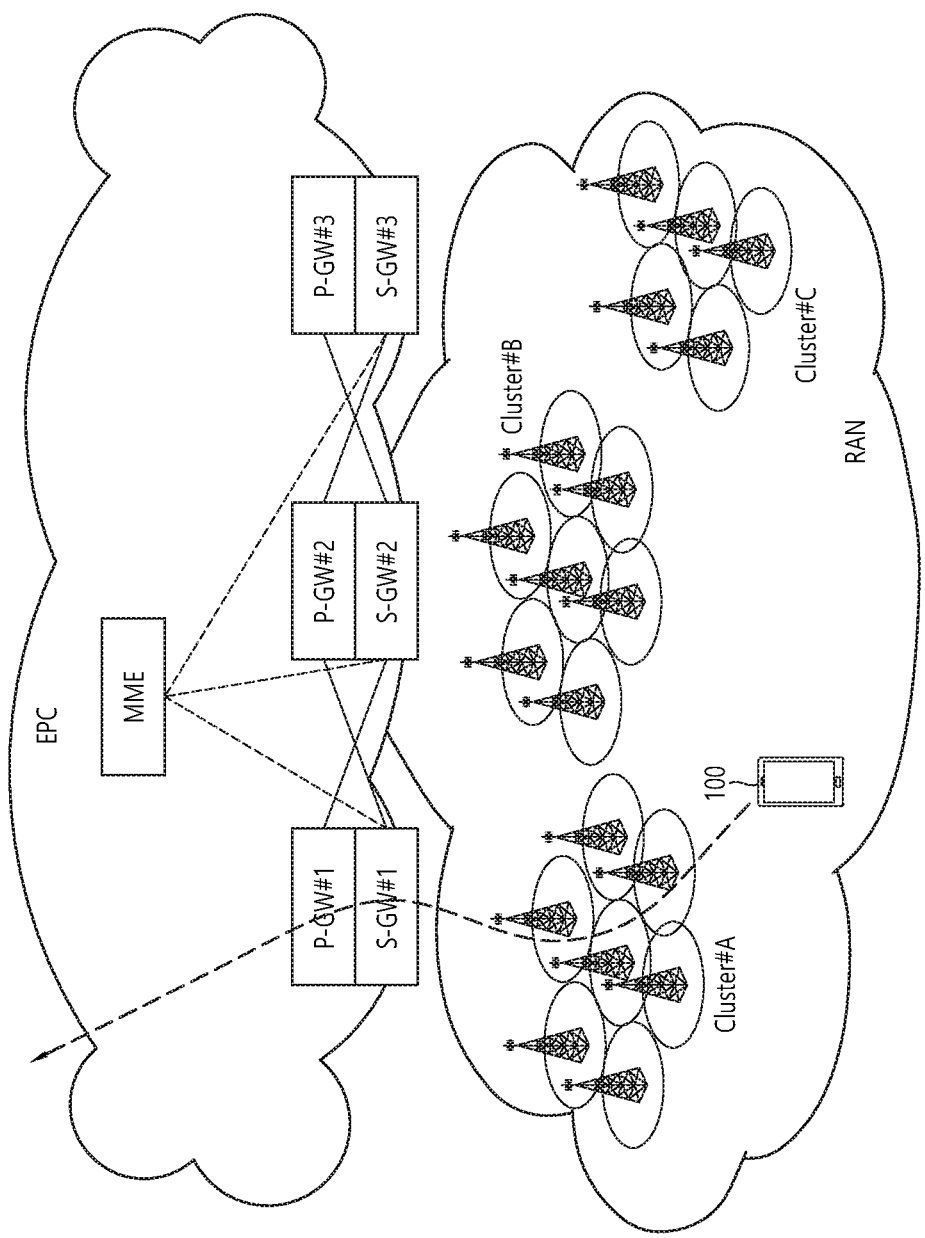
FIGS. 10*a* and 10*b* illustrate one scenario of C-SIPTO under consideration in the 3GPP release 13.
Figure 10B:
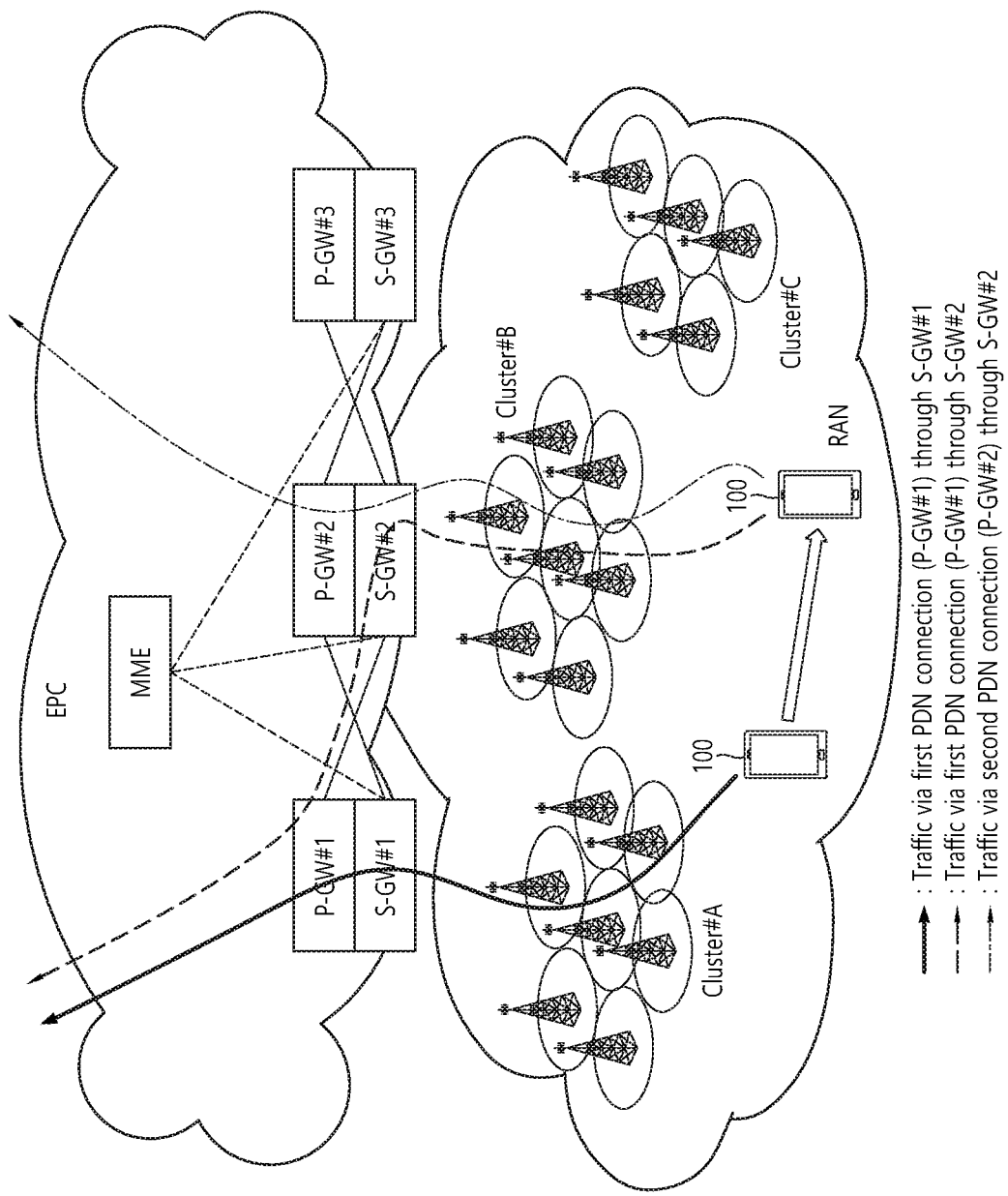

FIGS. 10a and 10b Illustrate One Scenario of C-SIPTO Under Consideration in the 3GPP Release 13.

Referring to FIG. 10a, when the UE 100 located within the cluster # A requests a PDN connection by using a particular Access Point Name (APN), the MME establishes a first PDN connection via P-GW #1 located closest geographically to the current location of the UE 100 to optimize backhaul transmission over the EPC network.

Afterwards, the user of the UE 100 performs a long-lived service, for example, a conference call, for which service continuity is most important, by using the first PDN connection.

Afterwards, as shown in FIG. 10b, the UE 100 moves from the cluster # A to the cluster # B. Then the MME relocates the first PDN connection for the long-lived service of the UE 100 to go through the S-GW #2. Here, since the first PDN connection for the long-lived service of the UE 100 requires continuity, the IP address of the UE 100 has to be maintained, and therefore, the MME keeps the P-GW #1 at its current state without reselecting (or relocating) the P-GW #2 which is closest to the current location of the UE.

Meanwhile, while maintaining the first PDN connection for a long-lived service through the S-GW #2 and the P-GW #1, if the UE 100 requests a new, second PDN connection for a different short-lived service, the MME makes the new, second PDN connection go through the P-GW #2. However, if the UE 100 requests a new long-lived service, the MME instructs to use the P-GW #1 via the first PDN connection instead of generating a new, second PDN connection. As described above, the reason for not creating the second PDN connection via the P-GW #2 for a new long-lived service is to prevent various PDN connections from being distributed over multiple P-GWs according to the UE's mobility.

Once the new, second PDN connection which goes through the P-GW #2 is established, a short-lived service other than the long-lived service is transmitted and received through the new, second PDN connection via the P-GW #2.

The first PDN connection which goes through the P-GW #1 is released only when the long-lived service is terminated, or it becomes impossible to maintain the first PDN connection any further.

As described above, C-SIPTO technique is restricted to enable only the new second PDN connection for a short-lived service to be established to be routed via the P-GW #2. In other words, the existing C-SIPTO technique also has the limitation that it is unable to route the existing first PDN connection to the P-GW #2 seamlessly.

Meanwhile, as described below, in the next-generation mobile communication, the so-called fifth mobile communication, nodes responsible for the user plane (UP) function, such as the S-GW/P-GW, are designed to be more flexible, and a larger number of nodes are expected to be deployed. However, since the existing C-SIPTO technique is unable to route PDN connections seamlessly, the existing C-SIPTO technique is not suitable for the next-generation mobile communication.

<Core Network for the Next-Generation Mobile Communication>

Meanwhile, in the next-generation mobile communication, the so-called fifth mobile communication, it is expected that data service with a minimum speed of 1 Gbps is realized. Therefore, overload on the mobile communication core network is expected to be increased further.

Therefore, redesign of the core network is required urgently in the so-called fifth mobile communication.

Figure 11:
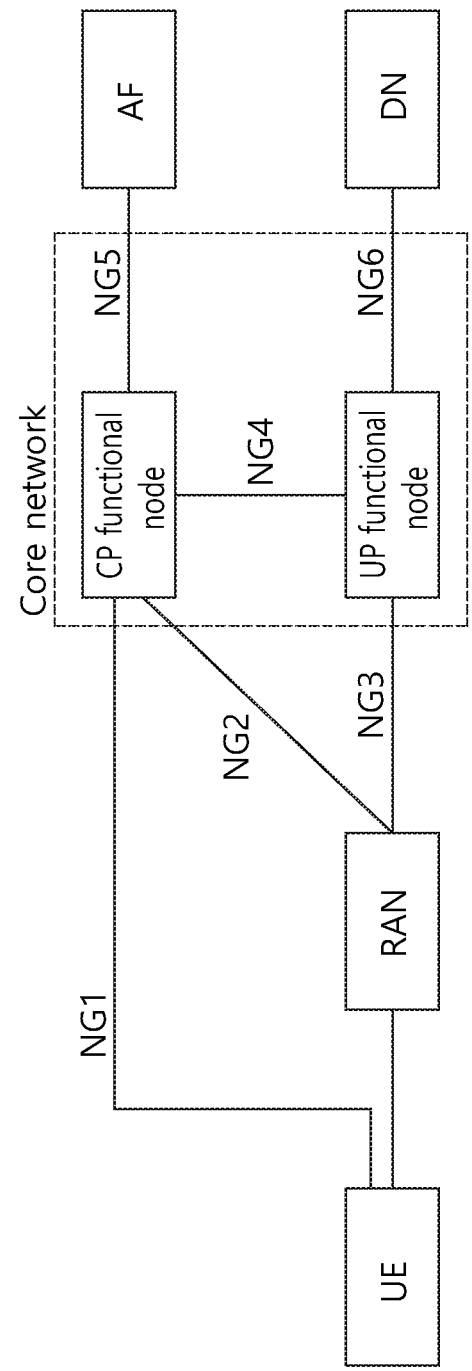
FIG. 11 illustrates an expected structure of a core network of the next-generation mobile communication.

FIG. 11 Illustrates an Expected Structure of a Core Network of the Next-Generation Mobile Communication.

As may be noticed from FIG. 11, a UE may be connected to the core network through the next-generation Radio Access Network (RAN). The next-generation core network may include a Control Plane (CP) functional node and a User Plane (UP) functional node. The CP functional node, which is a node managing UP functional nodes and RAN, transmits and receives a control signal. The CP functional node performs the whole or part of the functions of an MME in the fourth mobile communication. The UP functional node may perform the whole or part of the functions of an S-GW and a P-GW in the fourth mobile communication.

An Application Function (AF) node is an application server located within a Data Network (DN).

The UP functional node is designed to be more flexible, and a larger number of UP functional nodes are expected to be deployed. Accordingly, it is expected that a UP functional node is changed with a high possibility when a UE performs handover.

As described above, however, since the existing C-SIPTO technique is incapable of moving a PDN connection seamlessly, the existing C-SIPTO technique is not suitable for application to the next-generation mobile communication.

<Object Pursued by Disclosure of the Present Specification>

When a UP functional node (for example, a P-GW) which allocates an IP address to a UE in the mobile communication is changed, an existing session may not be maintained since a new IP address is allocated to the UE. In this case, a problem is caused that a user may experience service disruption. In addition, since the UE requires some time to re-connect the session by using the new IP address, a service is delayed for a predetermined period of time. These problems above may be solved partly by employing protocols such as MPTCP and SIP capable of maintaining a session.

However, protocols such as MPTCP and SIP have a limitation because they may be used only when both sides of communication (namely transmitting and receiving sides) support the corresponding protocols. For example, even if a UE supports a protocol which maintains a session, the corresponding protocol may still not be used if the server does not support the protocol. In particular, if a service provider providing services through the LTE system adopts the next-generation mobile communication (the so-called fifth mobile communication), the service provider will naturally attempt to provide all of the services that have been provided through an existing EPC in the same manner for the fifth mobile communication. However, it may require tremendous time and cost to update all of the application servers supporting legacy services to support the protocol; as a result, it seems unlikely that the protocol will be used.

Therefore, the disclosure of the present specification aims to provide a method for providing service continuity, leaving an application service for existing services intact.

DISCLOSURE OF THE PRESENT SPECIFICATION

The disclosure of the present invention proposes a method for maintaining a session even if the IP address of a UE is changed.

Figure 12:
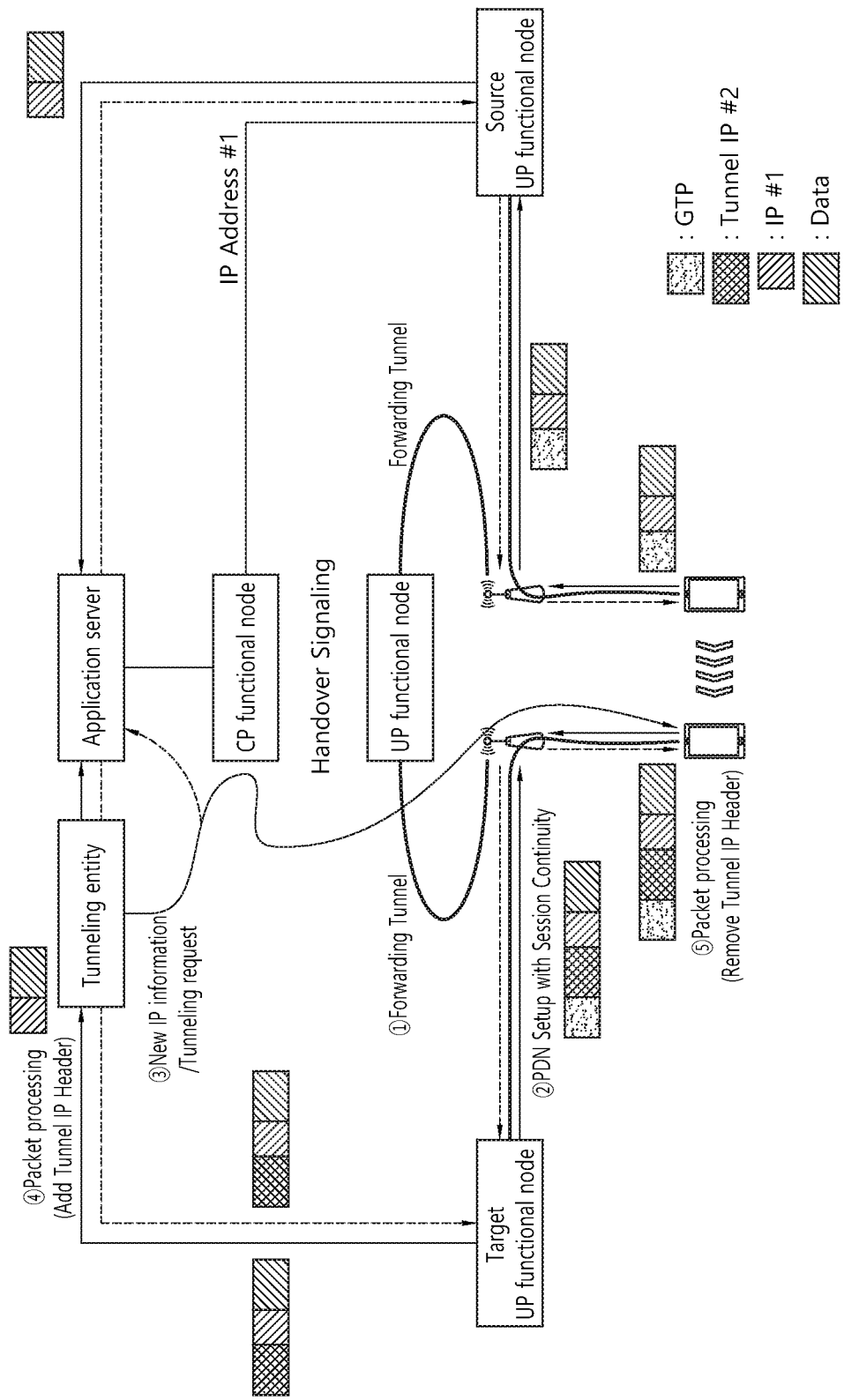
FIG. 12 illustrates a method according to a disclosure of the present specification.

FIG. 12 illustrates a method according to a disclosure of the present specification.

Referring to FIG. 12, the UE communicates with an application server (AS) by using the IP address #1 allocated by a first UP functional node (or a P-GW within an EPC for the fourth-generation mobile communication).

At this time, if the UE moves inside coverage of a target eNB, handover is performed. More specifically, if the UE performs measurement and delivers the measurement result to a source eNB, the source eNB determines from the measurement result that handover to the target eNB is needed, after which handover is performed. To prevent data from being missed during the handover, the source eNB generates a tunnel for delivery of the data together with the target eNB. Meanwhile, due to the handover, an UP functional node (or a P-GW) is substituted by a different UP functional node (or a local P-GW).

The UE performs a procedure for creating a PDN connection with the different UP functional node (or local P-GW) through the target eNB and receives a new IP address #2 according to the procedure. Afterwards, the UE disconnects an existing PDN connection and communicates with the application server through the new PDN connection.

If it is determined that session continuity is required for communication with the application server, the UE informs the application server and a tunneling entity of the necessity for session continuity and informs them of a newly received IP address #2. Also, by informing a CP entity that the UE continues to use the existing IP address #1, the UE prevents the IP address #1 from being allocated to a different UE.

Meanwhile, an application of the UE, not recognizing the change of the IP address, generates an IP packet for uplink data by using the existing IP address #1 and delivers the generated IP packet to a lower layer. Then the lower layer encapsulates the received IP packet by using the newly allocated IP address #2 to generate a new IP packet and transmits the new IP packet to an UP functional node. The UP functional node does not specially deal with the corresponding IP packet but treats the IP packet in the same way as a normal packet. The packet encapsulated by using the IP address #2 goes through the tunneling entity before being delivered to the application server. The tunneling entity decapsulates the packet and delivers the decapsulated packet to the application server. In other words, by removing the header with the IP address #2 from the packet, the tunneling entity transforms the packet back to the original packet retaining only the IP address #1 and delivers the transformed packet to the application server. Therefore, even if failing to recognize that the IP address of the UE has been changed, the application server may still maintain the existing session.

On the other hand, if the application server transmits the IP packet of downlink data by generating the existing IP address #1 of the UE, the tunneling entity encapsulates the IP packet by using the IP address #2 and transmits the encapsulated IP packet. If receiving the IP packet, the lower layer of the UE decapsulates the received IP packet. In other words, by removing the header with the IP address #2 from the packet, the lower layer of the UE transforms the packet back to the original packet and delivers the transformed packet to the upper layer.

To monitor all of the packets communicated with the application server, the tunneling entity may be disposed in the vicinity of the application server or at the front of the gateway of the mobile communication core network. Therefore, according to the application used by the UE, the tunneling entity may exist for each application and may differ from each other. Therefore, the UE needs to be able to find an appropriate tunneling entity. To this end, if the UE queries a CP function node or transmits a PDN connection request message by including therein an indication indicating a PDN connection requiring session continuity, a CP entity may deliver a PDN connection accept message by including therein an identifier of an appropriate tunneling entity.

Figure 13A:
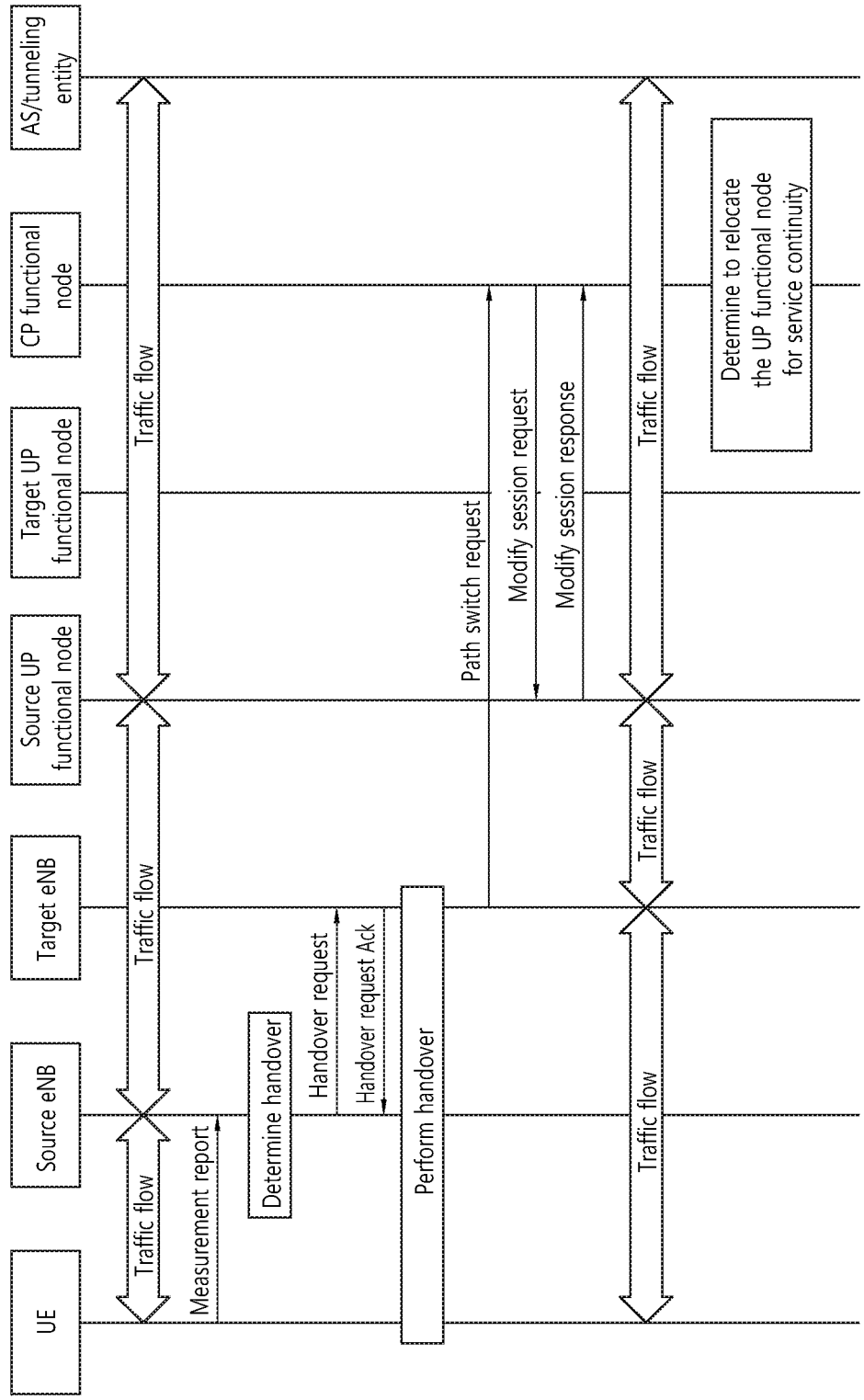
FIGS. 13*a* and 13*b* illustrate a signal flow diagram of a process for supporting service continuity as a UE performs encapsulation after handover.
Figure 13B:
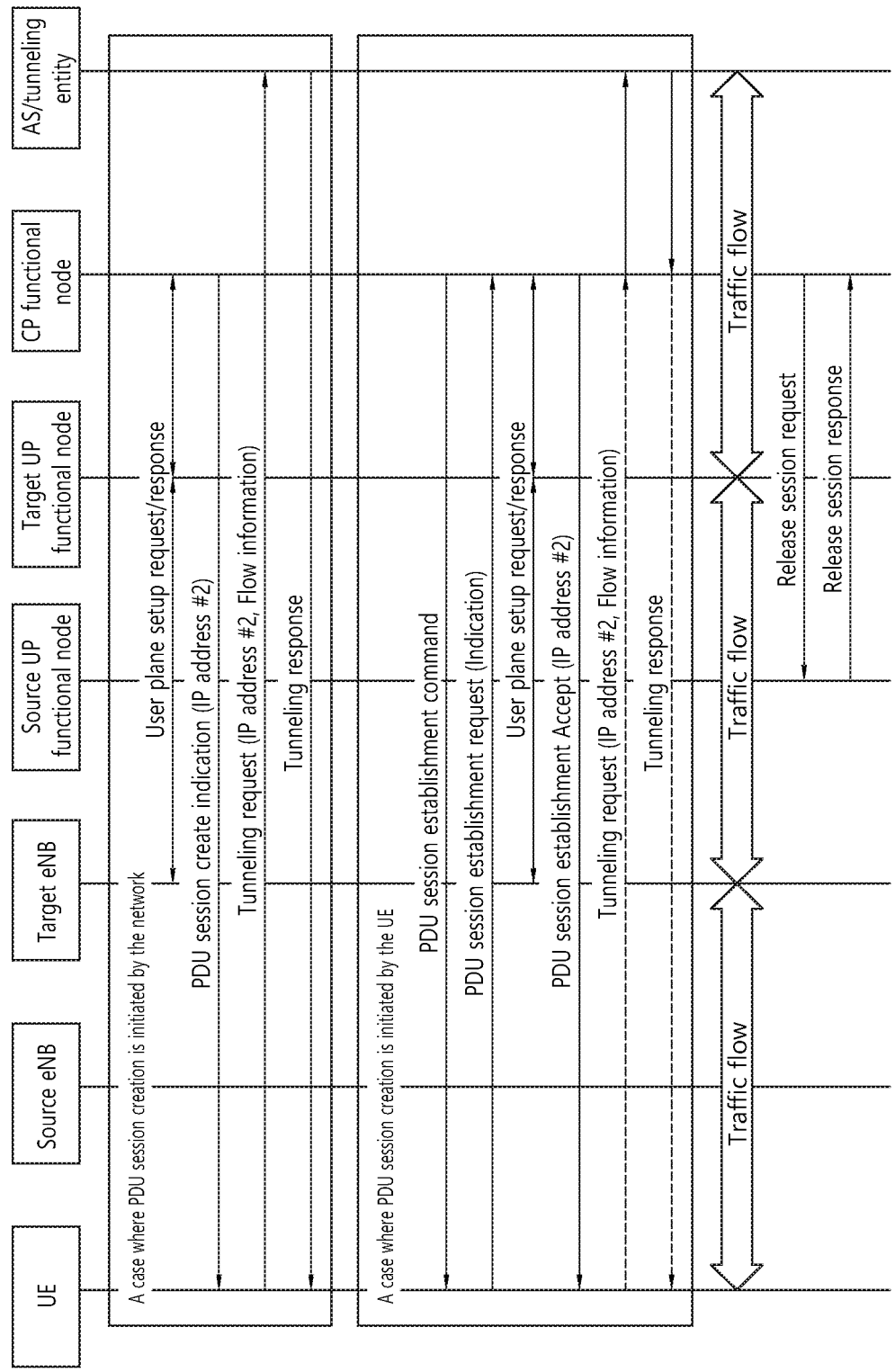

FIGS. 13a and 13b Illustrate a Signal Flow Diagram of a Process for Supporting Service Continuity as a UE Performs Encapsulation after Handover.

First, movement of a UE initiates handover from a source eNB to a target eNB.

After the handover is successfully performed, traffic flow is delivered to an application server via the target eNB and a source UP functional node.

Afterwards, a CP functional node of the network determines to relocate (namely change) the UP functional node for the UE. For example, when a routing path is inefficient or the source UP functional node is overloaded as the current location of the UE and the source UP functional node are far apart from each other, the CP functional node may be changed to a target UP functional node rather than to the source UP functional node.

When a relocation (namely change) from the source UP functional node to the target UP functional node is performed, a PDU session has to be created again. Creation of the PDU session may be initiated by the network or by the UE.

A. First, the following describes an example in which generation of the PDU session is initiated by the network.

A CP functional node performs a procedure for setting up a user plane between a target UP functional node and a target eNB. Once the procedure is completed successfully, the CP functional node allocates a new IP address #2 about the newly created PDU session to the UE. And the CP functional node delivers a message indicating that a PDU session has been created (namely a PDU session creation indication message) to the UE by including the allocated IP address #2 therein.

If the UE determines that service continuity is needed, the UE transmits a tunneling request to the application server/tunneling entity. Included in the tunneling request is the information indicating which flows require service continuity together with the newly allocated IP address #2. For example, by using TFT, the UE may inform of which flows require service continuity. The request sent by the UE is delivered in the form of a control signal through the CP functional node. At this time, the CP functional node may determine whether to allow service continuity. If the CP functional node determines not to allow service continuity, the CP functional node transmits a tunneling reject message to the UE, thereby informing the UE that service continuity is not allowed. Or the CP functional node may allow service continuity only for part of the flows by updating the TFT information that the UE has delivered. When the service continuity is allowed, the CP functional node sends a tunneling response message to the UE. The tunneling response message includes information about which flows are supported with service continuity.

B. Meanwhile, the following example describes a case in which creation of the PDU session is initiated by the UE.

The CP functional node delivers a command instructing to establish a new PDU session to the UE. If it is determined that service continuity is needed, the UE may transmit a PDU session establishment request message by including therein an indication indicating that service continuity is needed.

Then the target UP functional node creates a new PDU session and allocates a new IP address #2 for the UE. The target UP functional node transmits a PDU session establishment accept message by including the new IP address #2 therein.

If the UE determines that service continuity is needed, the UE transmits a tunneling request to the application server/tunneling entity. Included in the tunneling request is the information indicating which flows require service continuity together with the newly allocated IP address #2. However, if the UE has transmitted the PDU session creation request message by including therein information about a flow which requires service continuity, the UE may not transmit the tunneling request directly, but the CP functional node may transmit the tunneling request on behalf of the UE. The CP functional node transmits a tunneling response message to the UE. At this time, the tunneling response message includes information about which flows are supported with service continuity.

If the UE initiates the PDU session creation, an advantageous effect is obtained that the process for creating a PDU session need not be greatly improved. On the other hand, when the network initiates the PDU session creation, the network is allowed to first create a PDU session without exchanging signaling with the UE, deferring notifying the UE of the information about the created PDU session to a later time. Accordingly, a PDN session may be created promptly, and thereby an advantage is obtained that the overall time for handover is shortened.

Meanwhile, for both of the A and the B, the UE creates a packet by using the new IP address #2 for those flows not requiring service continuity and delivers the created packet to the target UP functional node.

Meanwhile, the UE creates an IP packet by using the existing IP address #1 for those flows requiring service continuity, encapsulates the created IP packet by using the new IP address #2, and delivers the encapsulated packet to the target UP functional node.

The tunneling entity may determine which flows have to be processed from the flow information received from the CP functional node and the new IP address #2 of the UE. In other words, the tunneling entity removes the new IP address #2 within the packet for the flow requiring service continuity but leaves only the existing IP address #1, after which the packet is delivered to the application server. However, the packets for the flow not requiring service continuity are transmitted to the application server without particular processing applied to the packets.

Figure 14:
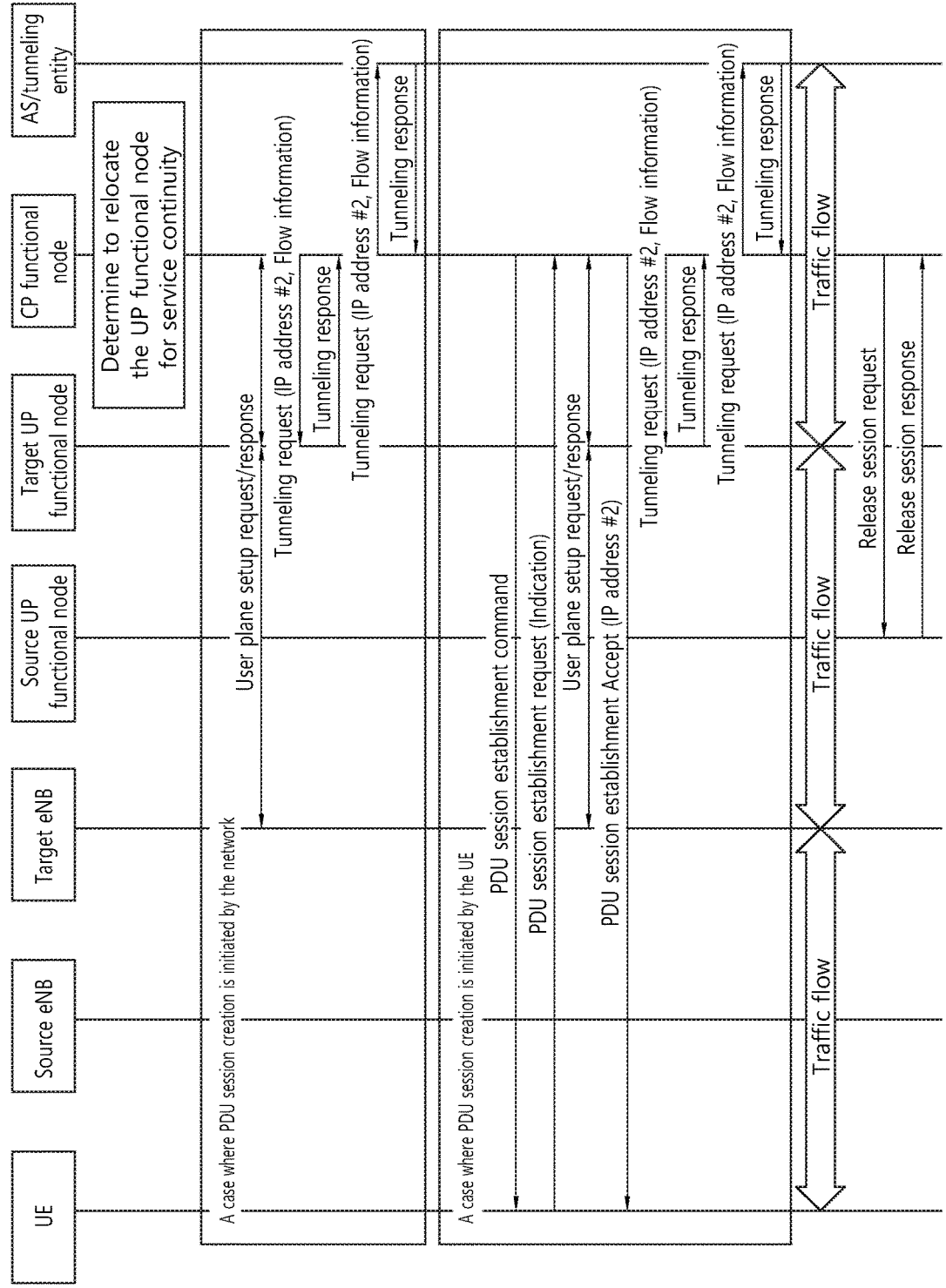
FIG. 14 is a signal flow diagram illustrating a process for supporting service continuity as a target UP functional node performs encapsulation after handover.

FIG. 14 is a signal flow diagram illustrating a process for supporting service continuity as a target UP functional node performs encapsulation after handover.

Referring to FIG. 14, the UE does not perform encapsulation, but the target UP functional node may perform the encapsulation instead. In this case, the UE, without any improvement, may create an IP packet by simply using a new IP address #2 and transmit the created IP packet. The target UP functional node may distinguish a flow which requires service continuity from a flow which does not require service continuity. When service continuity is required, the target UP functional node encapsulates the IP packet by using the existing IP address #1 and transmits the encapsulated IP packet.

Therefore, an advantageous effect may be obtained that service continuity may be provided without improving the UE as well as the application server.

The method illustrated in FIG. 14 may also be applied to the case where a UE performs handover from LTE-based RAT to 5G-based RAT. For example, if the UE performs handover to the 5G-based RAT while receiving a service from an EPC through the LTE-based RAT, the service to the UE may be continued by the 5G mobile communication.

Figure 15A:
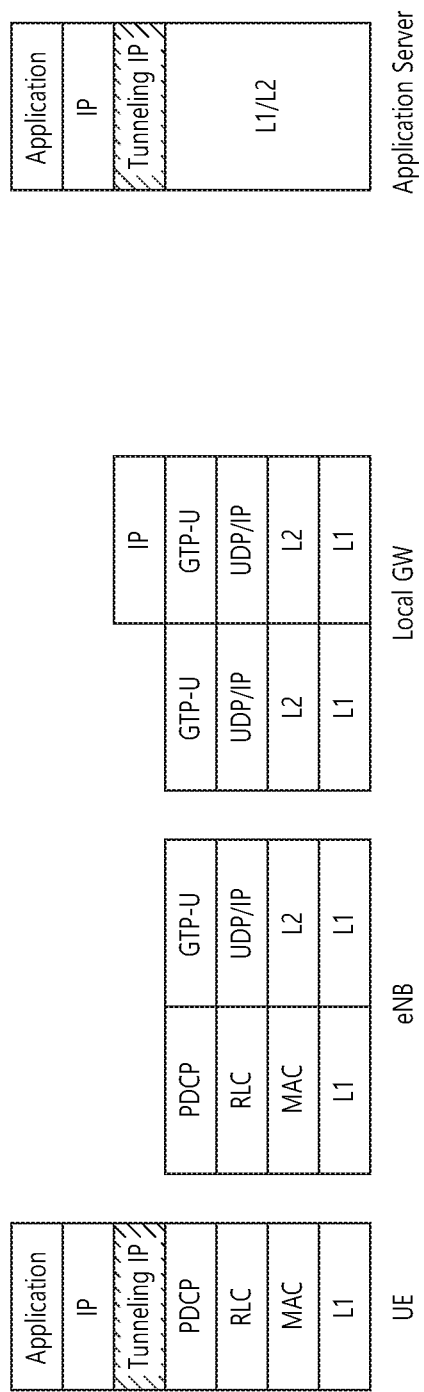
FIGS. 15*a* and 15*b* illustrate a protocol stack of the user plane.
Figure 15B:
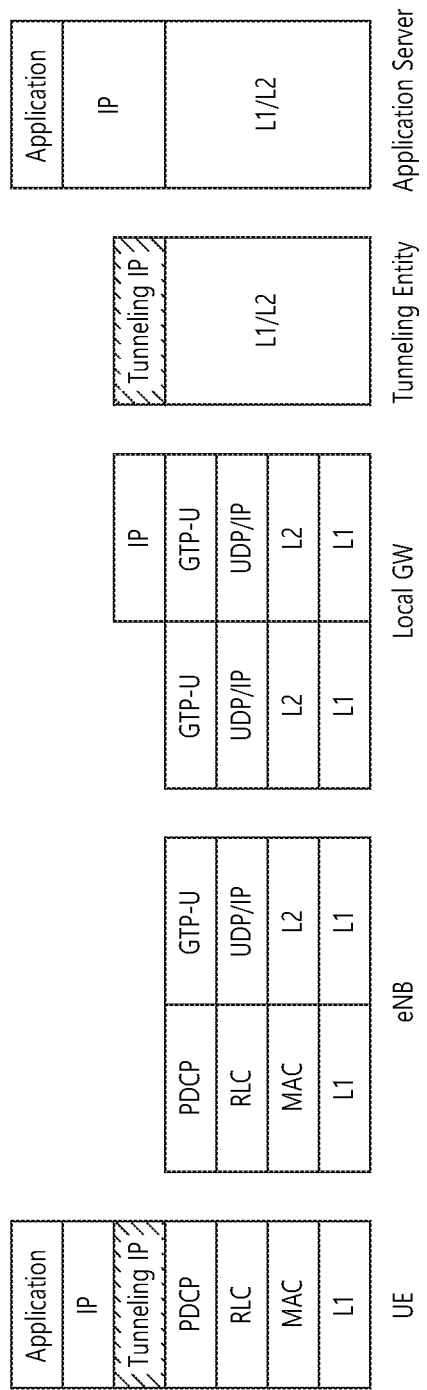

FIGS. 15a and 15b Illustrate a Protocol Stack of the User Plane.

FIG. 15a illustrates an example in which a tunneling entity exists inside the application server. FIG. 15b illustrates an example in which a tunneling entity exists separately from the application server.

The tunneling layer of the UE selectively removes the IP address #2 from those packets requiring service continuity among received downlink data and delivers the packets to the upper layer. To this purpose, the tunneling layer may receive information about a flow which requires service continuity from the layer managing a session of the UE such as Non Access Stratum (NAS). The information may have various forms such as a specific IP address unit or a combination of an IP address and port numbers, a combination of various IP addresses and port numbers, and bearer information. From the information above, the tunneling layer manages only those flows requiring service continuity and bypasses other flows.

Figure 16:
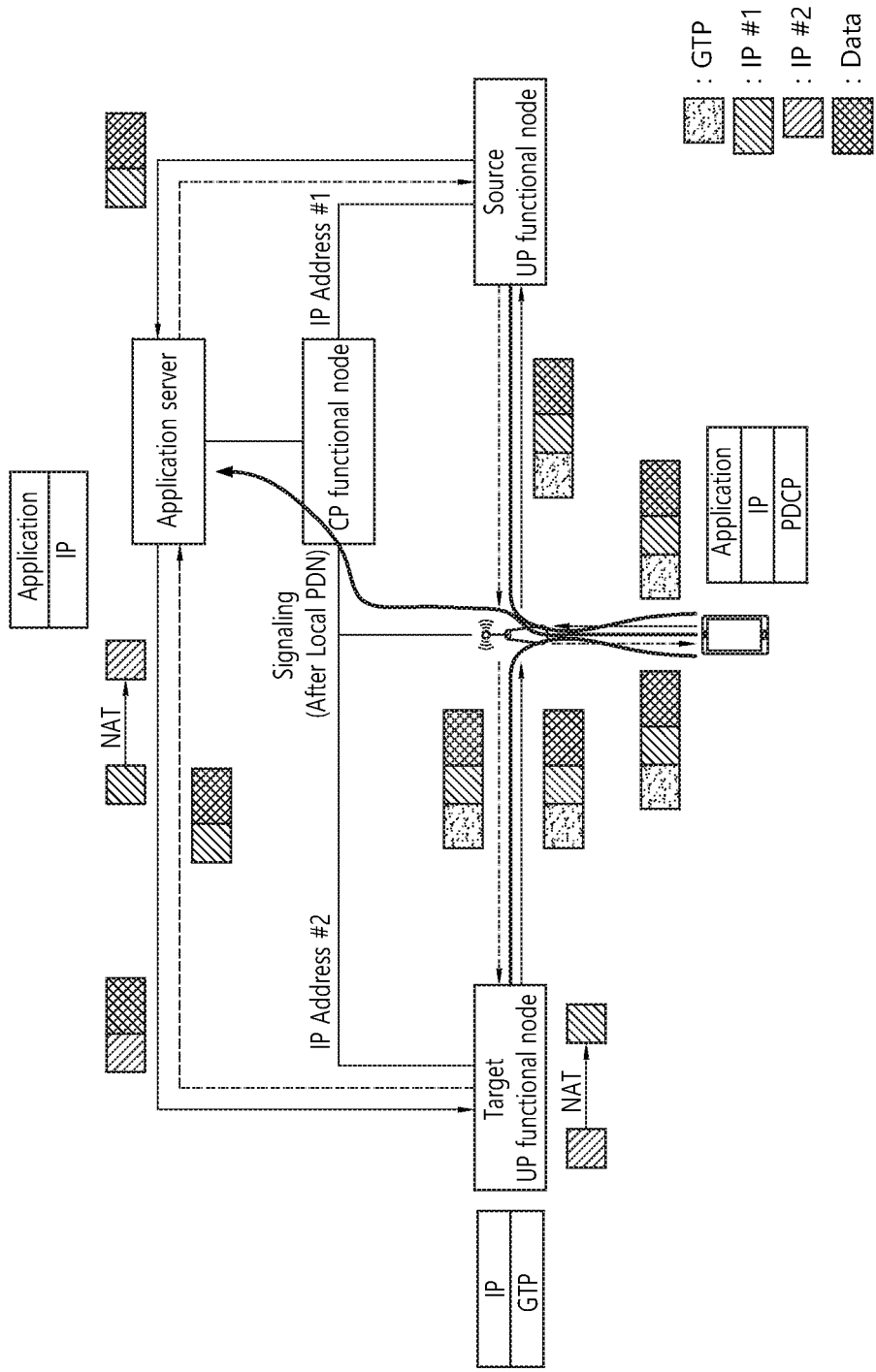
FIG. 16 is a signal flow diagram illustrating an example in which service continuity is supported by using a Network Address Translation (NAT) function after handover.

FIG. 16 is a Signal Flow Diagram Illustrating an Example in which Service Continuity is Supported by Using a Network Address Translation (NAT) Function after Handover.

Referring to FIG. 16, instead of encapsulating an IP address, the IP address #1 may be changed to the IP address #2 by using the NAT function. Also, when it is difficult for the UE to use the NAT function, the IP address #1 may be delivered to the UP functional node, after which the UP functional node may perform the NAT function.

The content described so far may be implemented by hardware. The implementation will be described with reference to FIG. 17.

Figure 17:
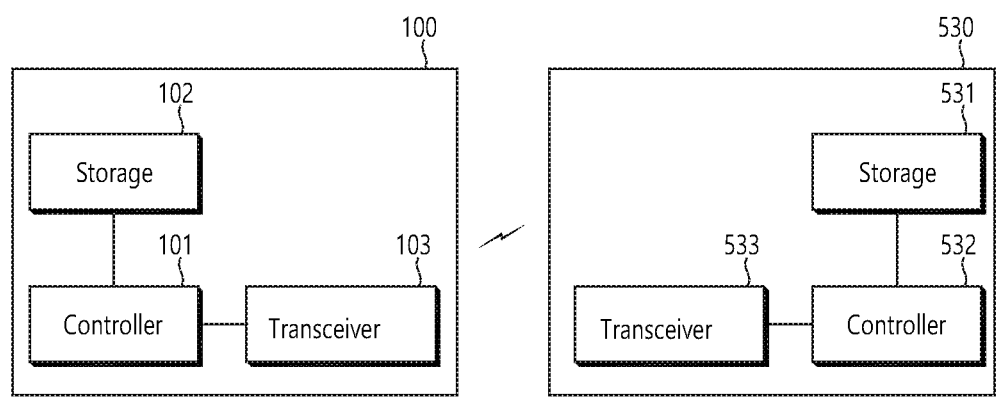
FIG. 17 illustrates a block diagram of a UE 100 and a network node according to an embodiment of the present invention.

FIG. 17 Illustrates a Block Diagram of a UE 100 and a Network Node According to an Embodiment of the Present Invention.

As shown in FIG. 17, the UE 100 includes a storage means 101, controller 102, and transmission and reception unit 103. And the network node 530 may be an UP functional node or a CP functional node. The network node includes a storage means 531, controller 5322, and transmission and reception unit 533.

The storage means stores the aforementioned method.

The controllers control the storage means and the transmission and reception units. More specifically, the controllers execute the methods stored in the storage means, respectively. And the controllers transmit the aforementioned signals through the transmission and reception units.

In this document, preferred embodiments of the present invention have been described, but the technical scope of the present invention is not limited only to the specific embodiments. Therefore, the present invention may be modified, changed, or updated in various ways within the technical principles and scope defined by the appended claims.

What is claimed is:

1. A method for supporting service continuity after handover, the method performed by a user equipment (UE) and comprising:

performing a handover to a target eNodeB (eNB), wherein the handover to the target eNB leads to a relocation from a source user plane (UP) functional node to a target UP functional node;

receiving, from a Control Plane (CP) functional node, an instruction commanding to establish a new protocol data unit (PDU) session;

transmitting a PDU session establishment request message to establish the new PDU session with the target UP functional node, based on the relocation from the source UP functional node to the target UP functional node;

receiving a PDU session establishment response message including a newly allocated second Internet Protocol (IP) address;

transmitting a tunneling request message including information about the newly allocated second IP address and information about a service flow requiring service continuity;

encapsulating, by a lower layer of the UE, a packet, which has been generated with an existing first IP address by an upper layer of the UE, with the newly allocated second IP address; and transmitting the encapsulated packet to a tunneling entity.

2. The method of claim 1, wherein the PDU session establishment request message comprises an indication indicating a need for service continuity.

3. The method of claim 1, further comprising:

receiving an IP packet by the lower layer from the eNB;

performing decapsulation for removing a header with the second IP address from the received IP packet; and delivering a packet of which the header with the second IP address is removed and which retains only the first IP address to the upper layer of the UE.

4. A user equipment (UE) supporting service continuity after performing handover, the UE comprising:

a transceiver; and a processor controlling the transceiver, wherein the processor is configured:

to perform a process for performing a handover to a target eNodeB (eNB);

wherein the handover to the target eNB leads to a relocation from a source user plane (UP) functional node to a target UP functional node;

to perform a process for receiving, from a Control Plane (CP) functional node, an instruction commanding to establish a new protocol data unit (PDU) session;

to perform a process for transmitting a PDU session establishment request message to establish the new PDU session with the target UP functional node, based on the relocation from the source UP functional node to the target UP functional node;

to perform a process for receiving a PDU session establishment response message including a newly allocated second Internet Protocol (IP) address;

to perform a process for transmitting a tunneling request message including information about the newly allocated second IP address and information about a service flow requiring service continuity;

to perform a process for encapsulating, by a lower layer of the UE, a packet, which has been generated with an existing first IP address by an upper layer of the UE, with the newly allocated second IP address; and to perform a process for transmitting the encapsulated packet to a tunneling entity.

5. The UE of claim 4, wherein the PDU session establishment request message comprises an indication indicating a need for service continuity.

6. The UE of claim 4, wherein the processor is further configured:

to perform a process for receiving an IP packet by the lower layer from the eNB;

to perform a process for decapsulation for removing a header with the second IP address from the received IP packet; and to perform a process for delivering a packet of which the header with the second IP address is removed and which retains only the first IP address to the upper layer of the UE.

* * * * *